United States Patent [19]
Hebert et al.

[11] Patent Number: 6,073,774
[45] Date of Patent: Jun. 13, 2000

[54] PRESSURIZED DEINKING MODULE WITH VENT LINE

[75] Inventors: Richard P. Hebert, Lanesboro, Mass.; Michael McKenzie, Nashua, N.H.

[73] Assignee: Beloit Technologies, Inc., Wilmington, Del.

[21] Appl. No.: 09/062,266

[22] Filed: Apr. 17, 1998

Related U.S. Application Data

[63] Continuation-in-part of application No. 08/834,606, Apr. 14, 1997, Pat. No. 5,840,156.
[51] Int. Cl.[7] .................................. B03D 1/24; B03D 1/14
[52] U.S. Cl. .............................. 209/170; 209/1; 209/168; 210/221.2; 162/4
[58] Field of Search ...................................... 209/168, 170, 209/1; 210/221.2; 162/4

[56] References Cited

U.S. PATENT DOCUMENTS

| | | |
|---|---|---|
| 4,190,522 | 2/1980 | Trä . |
| 4,288,319 | 9/1981 | Heijs . |
| 4,328,095 | 5/1982 | Ortner . |
| 4,618,430 | 10/1986 | Favret, Jr. et al. . |
| 4,952,308 | 8/1990 | Chamberlin et al. . |
| 5,273,624 | 12/1993 | Chamberlin et al. . |
| 5,330,655 | 7/1994 | Schneiss . |
| 5,417,806 | 5/1995 | Matzke . |
| 5,804,061 | 9/1998 | Hebert et al. . |
| 5,840,156 | 11/1998 | Hebert et al. . |

FOREIGN PATENT DOCUMENTS

| | | |
|---|---|---|
| 1335147 | 4/1995 | Canada . |
| 432928 A2 | 11/1990 | European Pat. Off. . |
| 432928 A3 | 11/1990 | European Pat. Off. . |
| 674040 A1 | 3/1995 | European Pat. Off. . |
| 6-316886 | 11/1994 | Japan . |
| 1475631 | 6/1977 | United Kingdom . |

*Primary Examiner*—Thomas M. Lithgow
*Attorney, Agent, or Firm*—Patrick J. G. Stiennon

[57] ABSTRACT

A mixture of air, paper stock made from recycled paper, foaming agents and surfactants are injected into a pressurized container. The container has a stock inlet at an end opposite a stock outlet, and three outlets arranged along the top of the container between the stock inlet and the stock outlet. The first top outlet nearest the stock inlet is separated from the second and third outlets by a baffle, and the second and third outlets are separated from the stock outlet by a baffle. Each outlet has a valve which controls flow from that outlet. By adjusting the outlet valves, foam and waste ink is vented from the first and second outlets from the stock inlet, while stock is vented from the third outlet which is closest to the stock outlet. The stock passing through the third outlet is recycled through the container.

6 Claims, 2 Drawing Sheets

PRESSURIZED DEINKING MODULE WITH VENT LINE

CROSS REFERENCE TO RELATED APPLICATIONS

This application is a continuation-in-part of application Ser. No. 08/834,606, filed Apr. 14, 1997, now U.S. Pat. No. 5,840,156 entitled Multiflow Pressurized Deinking Module, which is incorporated herein by reference.

FIELD OF THE INVENTION

The present invention relates generally to froth floatation separation and has particular use in the field of deinking of paper in a process for recycling waste paper. More specifically, the invention relates to an apparatus for separating ink-laden foam from a slurry of papermaking stock.

BACKGROUND OF THE INVENTION

The manufacture of paper from recycled paper waste, especially post-consumer waste, has become a major industry. Recycling efforts throughout the United States have made large quantities of recycled paper available. This, combined with the high cost of virgin wood fibers, has raised the economic importance of paper manufactured from recycled fibers.

The value of the paper manufactured from recycled fiber, like the value of paper manufactured from virgin fiber, is dependent on the mechanical properties of the paper and the appearance of the paper. Appearance is chiefly measured in terms of brightness, which for recycled paper means a lack of ink particles and outer dark material endemic to recycled fiber sources.

The principal use of paper is for printing and the vast majority of all printed inks are based on carbon particles. Thus, a pulp manufactured from recycled paper is typically contaminated with a substantial amount of particulate carbon. The carbon from printers' ink is chemically detached from the fiber and must be mechanically separated from the fiber if a high quality sheet is to be manufactured from the recycled stock.

There are three basic ways of cleaning recycled stock: washing the stock, using floatation separation techniques, and using hydrocyclones. Generally all three techniques are used.

Floatation separation techniques can be particularly advantageous, especially the techniques such as those disclosed in U.S. Pat. No. 5,273,624 which is incorporated herein by reference. The U.S. Pat. No. 5,273,624 patent shows how a sealed floatation chamber allows the use of vacuum or pressure within the chamber to simplify the collection and removal of the foam containing the carbon particles.

In general the floatation technique (long utilized in the mining industry) utilizes surfactants and various chemical additives to produce a stable foam or froth. The surfactants preferentially attach to the material to be separated and to the surface of a bubble of air, thus attaching the carbon particle to air bubbles introduced into the stock. The air rises through the pulp stock and is removed along with the carbon particles. Unlike the mining industry, where the material floated to a surface is the desired product, the floatation material in recycling paper is a waste product. Thus the controlling goal is complete removal of carbon from the paper stock and the loss of some fiber with the carbon contamination is acceptable and even desirable.

Although the systems disclosed in the U.S. Pat. No. 5,273,624 patent are a significant improvement on prior systems there is considerable economic incentive and need for systems which are more compact and efficient. Sources of recycled fiber are lower cost than virgin fiber, yet recycled fiber typically requires more processing to improve the quality of the paper manufactured. Thus, any improvement in separation efficiency by reducing the number of cleaning steps makes an important contribution to the economic viability of recycling paper fibers.

SUMMARY OF THE INVENTION

The pressurized floatation system of this invention utilizes a cylindrical processing container which has a conical inlet and a conical outlet. A mixture of air and paper stock made from recycled paper is injected into the inlet. The recycled stock contains ink particles which have been chemically released from the wood fibers. Foam forming additives are combined with the stock to create a foam which rises through the stock. The surfactants encourage the ink particles to adhere to the air bubbles, resulting in a foam containing a concentrated fraction of the ink particles with some included fibers. The foam, being lighter than the surrounding stock, rapidly rises to the top of the container, and carries with it ink particles which can be removed from the stock.

A system of baffles is used to separate the foam containing ink particles from the stock. The stock is separated into a portion for recycling and an accept portion. The recycled portion is passed back to the inlet of the pressurized floatation system. The accept portion may be further cleaned using additional equipment and is used to manufacture paper.

Transverse baffles consisting of foraminous plates with numerous punched holes of about one-half inch diameter are positioned to create turbulence within the stock as it flows through the container. A collection baffle is positioned downstream of the transverse baffles to collect foam below and in front of a foam outlet. The foam outlet conducts waste foam consisting of air, ink particles and some fiber stock to a hydrocyclone where the air is separated from the foam and waste is discarded. A second baffle extending above and in front of the accept outlet separates a recirculation outlet from the accept outlet. An additional reject port is positioned behind the collection baffle upstream of the recycle outlet to remove all remaining air and foam before it reaches the recycle outlet.

It is a feature of the present invention to provide a system for removing ink particles from recycled paper pulp which is more efficient.

It is another feature of the present invention to provide a system for removing ink particles from recycled paper pulp for higher brightness paper.

It is a further feature of the present invention to provide a system for removing ink particles from recycled paper which effects a more complete removal of ink particles in a single pass through the system.

Further objects, features and advantages of the invention will be apparent from the following detailed description when taken in conjunction with the accompanying drawings.

DESCRIPTION OF THE PREFERRED EMBODIMENT

Figure 1:
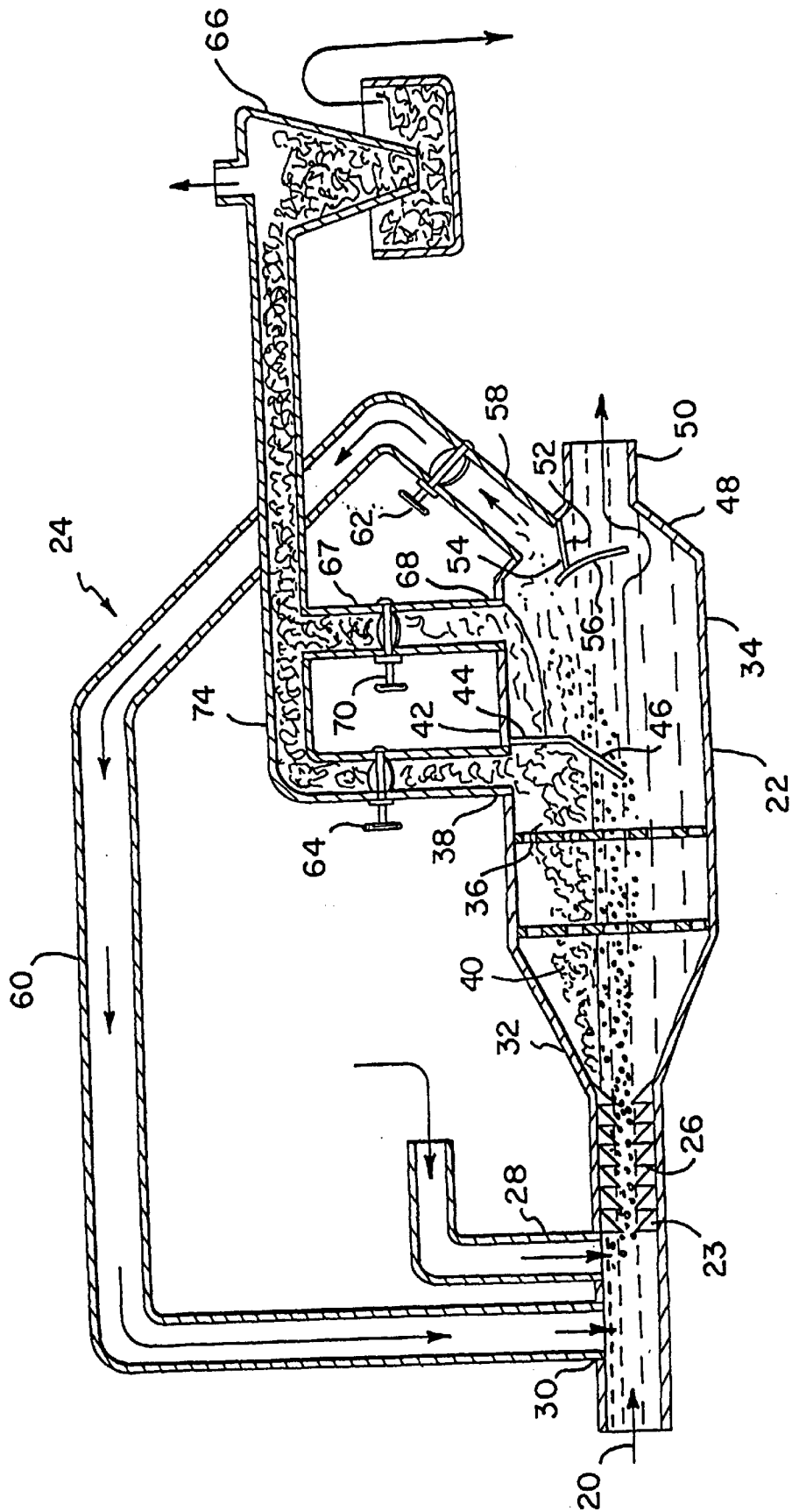
FIG. 1 is a schematic side elevational view of the pressurized floatation module of this invention.

The deinking system, or foam floatation module 24 (80) of the present invention receives stock, indicated by arrows 20, through an inlet pipe 23 which discharges into a container 22 (82). The stock contains 0.5 percent to about five percent paper fiber by weight. Circumferential turbulence-generating baffles 26 are positioned in the inlet pipe 23 downstream of an air injection port 28 and a foam recirculation port 30. The air injection port 28 and the foam recirculation port 30 introduce air and recirculated foam to be mixed with the stock entering the container 22 from the inlet pipe 23. The container 22. has a generally conical inlet section 32 which widens to a cylindrical body section 34. The inlet pipe 23 discharges fluid is into the conical inlet section 32.

Two foraminous baffles 36 (88, 90) extend across the cylindrical body 34 and help mix the air with the stock. The baffles 36 also help to prevent sloshing, or the build up of oscillations within the foam and stock contained in the body section 34 of the container 22. A foam outlet pipe 38 (94) is positioned approximately in the middle of the cylindrical body section 34 of the container 22 (82). The injected air creates a foam 40 which is substantially lighter than the surrounding stock and so will rise rapidly to the top 42 of the container 22. The surface foam 40 is drawn through the top 42 of the container 22 (82) and the out foam outlet pipe 38 (94).

A foam collection baffle 44 (99) is positioned downstream of the foam outlet 38 (94). The foam collection baffle 44 extends across the container cylindrical section 34 and down toward the geometric center of the cylindrical section. The foam collection baffle 44 (99) has portions 46 (102) which extends downwardly and upstream beneath the outlet 38 (94). The baffle section 46 extends downwardly to approximately the centerline of the cylindrical body section 34.

The cylindrical body section 34 (96) ends in a downstream conical section 48 (104). The conical section 48 (104) has an outlet 50 (86) for the cleaned stock. This outlet 50 is covered by a two-part baffle 52. The two-part baffle 52 has a first part 54 which extends almost directly upstream from the outlet 50. A second portion of the two-part baffle 52 depends downwardly from the first part 54. The second portion 56 of the baffle 52 blocks the entrance to the outlet 50 forcing the stock to flow down and under the baffle second portion. The baffle in FIG. 2 near outlet 112 is represented by 106, 110 and 114. Other elements of the module 80 are indicated by 120, 122. 126,128, 130, 134 with various flow arrows as shown by indicators 116 and 118.

A recirculation port 58 is positioned above the first part 54 of the two-part baffle 52. The recirculation port 58 opens to a recirculation line 60 which has a valve 62 which controls the amount of stock which is recirculated to the foam recirculation port 30 in the inlet pipe 23 of the container 22.

Flow through the foam outlet pipe 38 is controlled by a valve 64 and leads to a cyclone 66 which separates the water, fiber and ink particles from the air.

A vent port 68 communicates with the top of the container 22 between the foam collection baffle 44 and the recirculation port 58. This vent port 68 has been found to significantly reduce the amount of ink particles contained in the stock recirculating through the recirculation port 58. Sixty percent reductions in ink particles have been found when additional foam is withdrawn through the vent port 68. A vent line 67 extends from vent port 68, and a valve 70 is positioned within the vent line 67 to allow adjustment of the foam through the vent line so that air can be largely or completely eliminated from the recirculation port 58. By eliminating air exiting through the recirculation port 58, turbulence in stock exiting the recirculation port 58 is substantially reduced.

Reduction in turbulence of the recirculating stock improves the efficiency of any secondary cleaning which may be performed on the recirculating stock and reduces problems with any feed pumps which may be used with the recirculating stock.

Because the container 22 is sealed, the movement of the surface foam 40 from the container 22 into the outlet pipes 58, 68 is affected by system pressure or by a vacuum drawn on the foam outlets 58, 68. Preferably pressures above atmospheric will be used as this minimizes the amount of equipment required and reduces costs, as vacuum equipment is typically more expensive to operate then compressing equipment.

The ability to effectively remove remaining foam and air through the vent port 68 is facilitated by the different properties of air and water. If the valve 70 is only partially opened, it will present a considerable pressure drop or hydraulic resistance. Air, with a much lower in viscosity, can readily pass through the restriction represented by the valve, but the stock, being comprised largely of water can less easily pass through the restriction. In this way a partially opened valve 70 acts to vent air without passing significant quantities of stock.

By increasing the amount of foam removed through the vent port 68 the recirculating stock has a lower ink content and thus the stock flowing into the container 22 has a lower ink content. This improves the overall efficiency or effectiveness of the deinking system 24.

The outlet pipes 38, 58 may be connected to a header 74 and lead to a cyclone 66. The cyclone 66 separates the air from the foam leaving a waste stream containing some fiber together with the ink particles suspended in water. A twin-wire press (not shown) is used to dewater the waste stream which is then disposed of, typically as boiler fuel.

A water flush line (not shown) may be used to clean the outlet 50 by flushing with water from time to time.

The container 22 is sealed from the environment because all inputs and outputs to the container are controlled. A valve is not shown on the stock inlet 23 or on the stock outlet 50, however the rate at which stock and air is pumped in controls the pressure in the container 22. Although a valve may be used on the outlet 50, downstream equipment which further processes the stock, for example a pump, can also control the rate at which stock flows out of the container 22. For the deinking system 24 to work properly the valves 62, 64, 70 connected to the outlet are adjusted until the foam outlet 38 and the vent outlet 68 have essentially only foam and air. The recirculation port valve 62 is adjusted so that stock containing little or no air is removed for recycling. Adjustment of the valves may be by hand in an iterative fashion. Alternatively, a computer, programmable logic controller, et cetera, could be used and could employ sensors in the outlet lines that indicate type or density of flow.

A sensor to monitor the interface between the surface foam and the stock in the container 22 is not required because the valves 62, 64, 70 can be adjusted so the flow of material through the foam outlet pipe is of the desired consistency.

Figure 2:
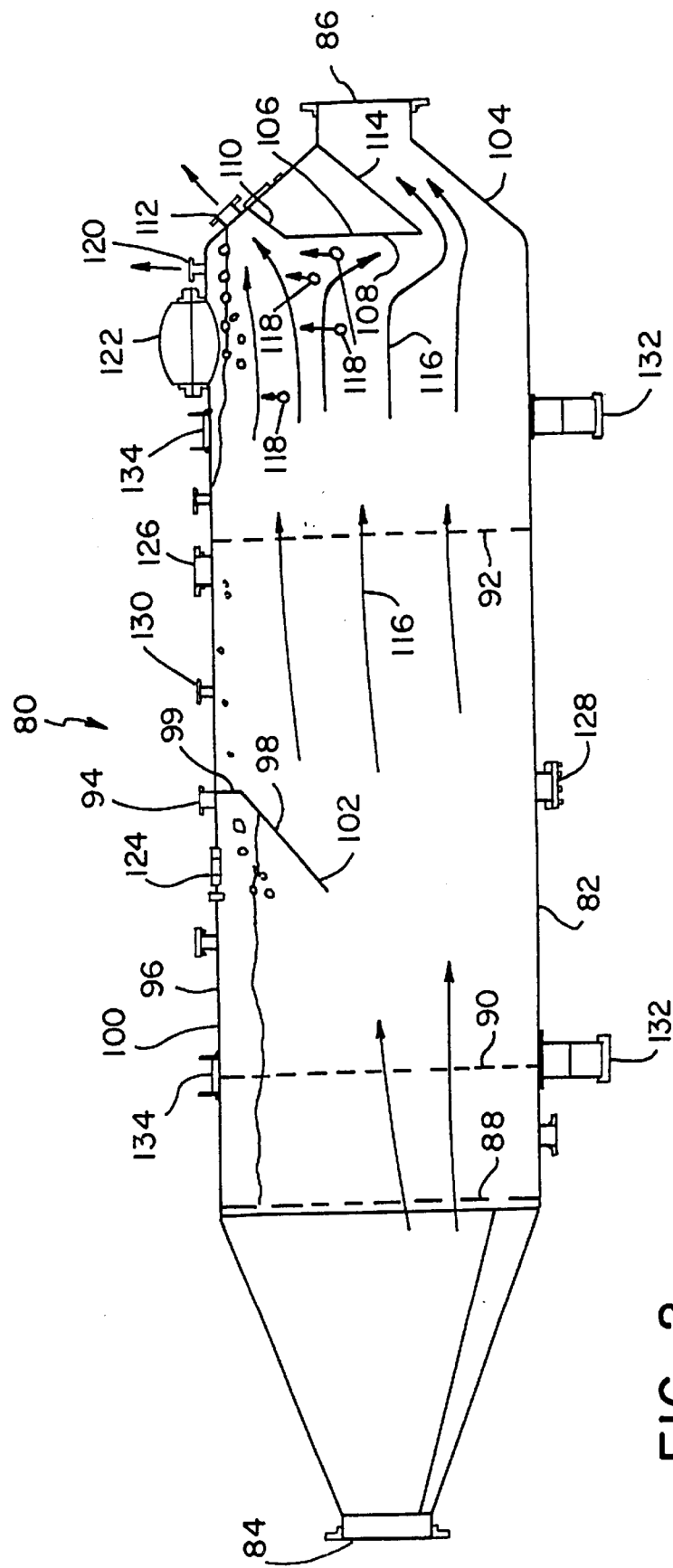
FIG. 2 is a schematic side elevational view of an alternative embodiment pressurized floatation model of this invention.

An alternative embodiment system 80 is shown in FIG. 2. The system 80 has a container 82 with an inlet 84 and an outlet 86. The container 82 has three foraminous baffles 88, 90, and 92. An outlet 94 is positioned at the top 96 of the container 82. A baffle 98 is positioned downstream of the outlet 94. The baffle 98 has a portion 99 that extends down toward the geometric center of the cylindrical section. The baffle 98 also has a portion 102 which extends downwardly and upstream beneath the outlet 94.

The container cylindrical section 100 ends in a downstream conical section 104. The conical section 104 has an outlet 86. A prismatic baffle 106 extends upstream of the outlet 86. The prismatic baffle 106 has a perpendicular surface 108 which extends across the outlet 86. The perpendicular surface 108 is supported by a surface 110 which leads to the port 112 and a surface 114 which is parallel to the surface 110 and leads to the upper side of the outlet 86. The perpendicular surface 108 is perpendicular to the streamline arrows 116. Air bubbles 118 are illustrated as flowing upwardly.

A vent port 120 communicates with the top of the container 96 between the baffle 98 and the port 112.

A manway 122 is positioned upstream of the port 120 and allows access to the interior of the container 82.

An attachment fixture 124 is positioned just upstream of the outlet 94.

Various additional ports 126 and 130 are positioned at the top of the container 82. A port 128 is positioned at the bottom of the container 82. Brackets 132 are mounted on the bottom of the container 82 and brackets 134 are mounted on the top of the container 82 directly above the brackets 132.

It should be understood that a deinking system 24 such as shown in the figure might typically have an inlet pipe 23 which is twenty-four inches in diameter and ten feet long and connect to a container 22 which has a cylindrical body section 34 which is about eighty-two inches in diameter and about twenty-five feet long. Typical flow in such a unit may be about 6,000 gallons per minute.

It is understood that the invention is not limited to the particular construction and arrangement of parts herein illustrated and described, but embraces such modified forms thereof as come within the scope of the following claims.

We claim:

1. A foam floatation module for separating ink particles by floatation from a stock fed therethrough, the module comprising:

a sealed generally cylindrical container horizontally disposed, the container having a generally conical shell forming a stock inlet at one end and a generally conical shell forming a stock outlet at the other end;

a quantity of papermaking stock, mixed with air and containing ink particles flowing through the container;

uppermost portions of the container having a first outlet connected thereto for removing ink laden foam from the container;

a first adjustable valve mounted to control the flow from the first outlet;

a first baffle extending downward from and joined to the uppermost portion of the container between the first outlet and the stock outlet;

an outlet baffle joined to the container and extending upstream of and spaced from the stock outlet, the outlet baffle positioned to prevent stock flow directly from the stock inlet to the stock outlet;

a second outlet connected to the container above the outlet baffle and between where the first baffle joins the container and where the outlet baffle joins the container; a second adjustable valve mounted to control the flow from the second outlet;

a third outlet connected to the container between the second outlet and where the first baffle joins the container; and a third adjustable valve mounted to control the flow from the third outlet, wherein the second outlet is connected to the stock inlet.

2. The apparatus of claim 1 wherein the first baffle has a portion which extends toward the stock inlet.

3. The apparatus of claim 1 further comprising at least one foraminous baffle extending substantially across the cylindrical container and positioned between the stock inlet and the first outlet.

4. The apparatus of claim 1 wherein the container is a horizontal tube having a circular cross section and wherein the stock inlet joins the tube by a conical transition section.

5. The apparatus of claim 4 wherein the stock outlet joins the horizontal tube by a conical transition section.

6. A deinking module for separating ink particles by floatation from an infed stock, the module comprising:

an axially extending container having an inlet end which opens to a body which is connected to an outlet end;

a stock inlet connected to the container inlet end;

a stock outlet connected to the container outlet end downstream of the inlet end;

a first foam outlet extending upwardly from the container body and positioned downstream of the stock inlet, wherein a source of reduced pressure is connected to the first foam outlet to remove ink laden foam from the container;

a first adjustable valve positioned within the first foam outlet to control the flow from the first foam outlet;

a first baffle connected to the container body downstream of the first foam outlet, and extending downwardly into the container body;

an outlet baffle connected to the container downstream of the first baffle and extending upstream of the stock outlet;

a recirculation outlet connected to the container above the outlet baffle and positioned downstream of the first baffle, the recirculation outlet communicating with the stock inlet to recirculate stock;

a second adjustable valve mounted within the recirculation outlet to control the flow from the recirculation outlet, the recirculation outlet discharging to the stock inlet;

a vent line connected to the container downstream of the first baffle and upstream of the recirculation outlet and extending upwardly from the container body, the vent line being connected to a source of reduced pressure to draw from the container; and a third adjustable valve mounted within the vent line to control the flow through the vent line.

* * * * *